US006942120B2

(12) United States Patent
Trent et al.

(10) Patent No.: US 6,942,120 B2
(45) Date of Patent: Sep. 13, 2005

(54) DISPOSABLE BAKEWARE WITH IMPROVED DRIP RESISTANCE AT ELEVATED TEMPERATURES

(75) Inventors: John S. Trent, Saginaw, MI (US); Thayer A. Brown, Jr., Midland, MI (US); Kent B. McReynolds, Racine, WI (US); Jeffrey T. Brown, Midland, MI (US)

(73) Assignee: S.C. Johnson & Son, Inc., Racine, WI (US)

( * ) Notice: Subject to any disclaimer, the term of this patent is extended or adjusted under 35 U.S.C. 154(b) by 347 days.

(21) Appl. No.: 10/163,382

(22) Filed: Jun. 7, 2002

(65) Prior Publication Data

US 2003/0229180 A1 Dec. 11, 2003

(51) Int. Cl.$^7$ .......................... A47J 37/01; A47J 27/00
(52) U.S. Cl. ................ 220/573.1; 220/573.2; 220/912
(58) Field of Search .................... 220/573.1, 573.2, 220/912

(56) References Cited

U.S. PATENT DOCUMENTS

| | | | |
|---|---|---|---|
| 2,465,319 A | 3/1949 | Whinfield et al. | |
| 3,005,795 A | 10/1961 | Busse et al. | |
| 3,047,539 A | 7/1962 | Pengilli | |
| 3,356,646 A | 12/1967 | Wynstra et al. | |
| 3,671,487 A | 6/1972 | Abolins | |
| 3,865,783 A | 2/1975 | Clutter | |
| 3,962,174 A | 6/1976 | Berardinelli | |
| 4,370,438 A | 1/1983 | DeGuia | |
| 4,440,889 A | 4/1984 | Hergenrother et al. | |
| 4,463,130 A | 7/1984 | Serini et al. | |
| 4,506,050 A | 3/1985 | Hergenrother et al. | |
| 4,563,508 A | 1/1986 | Cottis et al. | |
| 4,572,852 A | 2/1986 | Gartland et al. | |
| 4,741,955 A | 5/1988 | Saito et al. | |
| 4,786,686 A | 11/1988 | Laughner et al. | |
| 4,877,682 A | * 10/1989 | Sauers et al. ............... | 428/412 |
| 4,927,870 A | 5/1990 | Ogoe et al. | |
| 4,962,136 A | 10/1990 | Peters | |
| 5,023,137 A | 6/1991 | Smith et al. | |
| 5,079,289 A | 1/1992 | Layton et al. | |
| 5,091,464 A | 2/1992 | Huspeni et al. | |
| 5,096,957 A | 3/1992 | Duska | |
| 5,132,336 A | 7/1992 | Layton et al. | |
| 5,141,985 A | 8/1992 | Asai et al. | |
| 5,300,747 A | 4/1994 | Simon | |
| 5,308,913 A | 5/1994 | Asai et al. | |
| 5,418,270 A | 5/1995 | Peters | |
| 5,431,972 A | 7/1995 | Richeson et al. | |
| 5,492,946 A | 2/1996 | Huspeni et al. | |
| 5,552,469 A | 9/1996 | Beall et al. | |
| 5,578,672 A | 11/1996 | Beall et al. | |
| 5,641,549 A | 6/1997 | Johnston et al. | |
| 5,674,931 A | 10/1997 | Gallagher et al. | |
| 5,717,000 A | 2/1998 | Karande et al. | |
| 5,747,127 A | 5/1998 | Prince | |
| 5,760,121 A | 6/1998 | Beall et al. | |
| 5,837,763 A | 11/1998 | Ferraro et al. | |
| 5,843,545 A | 12/1998 | Prince | |
| 5,877,248 A | 3/1999 | Beall et al. | |
| 5,883,173 A | 3/1999 | Elspass et al. | |
| 6,060,549 A | 5/2000 | Li et al. | |
| 6,093,765 A | 7/2000 | Cottis | |
| 6,117,541 A | 9/2000 | Frisk | |
| 6,143,857 A | 11/2000 | Bansleben et al. | |
| 6,162,851 A | 12/2000 | Wood et al. | |
| 6,197,849 B1 | 3/2001 | Zilg et al. | |
| 6,203,923 B1 | 3/2001 | Bansleben et al. | |

FOREIGN PATENT DOCUMENTS

| | | |
|---|---|---|
| EP | 0 747 323 | 12/1996 |
| EP | 0 747 451 | 12/1996 |
| EP | 1 026 203 | 8/2000 |
| WO | 97/31053 | 8/1997 |
| WO | 98/53000 | 11/1998 |
| WO | 99/42518 | 8/1999 |
| WO | 00/18579 | 4/2000 |
| WO | 00/56781 | 9/2000 |
| WO | 00/56795 | 9/2000 |
| WO | 00/69957 | 11/2000 |
| WO | 00/69959 | 11/2000 |
| WO | 01/05880 | 1/2001 |
| WO | WO 01/21704 | 3/2001 |
| WO | 01/30864 | 5/2001 |
| WO | 01/48080 | 7/2001 |

OTHER PUBLICATIONS

LM Robeson et al., "Miscible Blends of Poly(Butylene Terphthalate) and the Poly (Hydroxy Ether) of Bisphenol A," Am. Chem. Soc., Div. Org. Coat. Plast. Chem., Pap. 37(1) 136 (1977).

LM Robeson, et al., "Miscible Blends of Poly(Butylene Terephthalate) and the Polyhydroxy–ether of Bisphenol A," J. Appli. Polym. Sci. 23,645 (1979).

J.Y. Liao, et al., "50B–45: Consumer purchase of chilled food packages: A simulated supermarket setting study," The Conference Exchange, Cumberland, RI, at http://www.confex2.com/ift/99annual/abstract/3772.htm.

"Product Information: Teflon®PTFE 6C," The DuPont Co., Wilmington, DE., Pub. No. H–03235–3, pp. 1–3 (Apr. 1999).

(Continued)

Primary Examiner—Michael J. Feely

(57) ABSTRACT

A thermoplastic bakeware article (i.e., an article formed to hold, contain or support food, while being heated in a microwave, conventional oven, convection oven, or the like) that is food-grade and resistant to dripping, stringing, and melting at high temperatures. The article has a composition comprising a partially crystalline polyester resin and a phenoxy resin. The composition is formulated so as to allow cross-linking between the polyester resin and the phenoxy resin at temperatures above about 400° F.

38 Claims, 1 Drawing Sheet

OTHER PUBLICATIONS

"Ciba®IRGANOX®1010," Ciba Speciality Chemicals, Inc., High Point, NC., pp. 1–2 (Oct. 1999).

"Ciba®IRGANOX® 245," Ciba Specialty Chemicals, Inc., High Point, NC., pp. 1–2 (Oct. 1981).

"Ciba®IRGANOX® 1425," Ciba Specialty Chemicals, Inc., High Point, NC., pp. 1–2 (Jan. 1980).

"Ciba® IRGANOX® 259," Ciba Specialty Chemicals, Inc., High Point, NC., pp. 1–2 (Mar. 1973).

J.L. Throne, "Technology of Thermoforming," Hanser Publishers, New York, NY., preface and pp. 648–687, (1996).

"Material Safety Data Sheet—Phenoxy Resin," Inchem Corp./Phenoxy Specialties, Rock Hill, SC., pp. 1–6, (May 27, 1999).

4,4 Isopropylidenediphenolepichlorohydrin thermosetting epoxy resins, 21 C.F.R. § 177.2280 (2000).

"Paphen Phenoxy Resins," InChem Corp., Rock Hill, SC., pp. 1–17, (1998).

"Phenoxy Resins PKHC, PKHH, and PKHJ," Phenoxy Associates, Rock Hill, SC., Pub. No. F–1001, pp. 1–2, (1993).

GF Levchik, et al., "Mechanisms of Action in Flame Retardent Reinforced Nylon 6," Polymer Degradation and Stability, Elsevier Sciences, Ltd., N. Ireland, v. 54, pp. 361–363 (1996).

S.T. Lee, "Foam Extrusion Principles and Practice," Technomic Publ. Co., Lancaster, PA., pp. 307–339, (2000).

G. Gruenwald, "Thermoforming: A Plastic Processing Guide, $2^{nd}$ Ed.," Technomic Publ. Co., Lancaster, PA., pp. 209–223, (1998).

G. Wypych, "Handbook of Fillers, $2^{nd}$ Ed.," Plastics Design Library, New York, NY., pp. 549, 547 (1999).

G. Wypych, "Handbook of Fillers, $2^{nd}$ Ed.," Plastics Design Library, New York, NY., pp. 654–655 (1999).

J.A. Brydson, "Plastic Materials, 4th Ed.," Butterworth Scientific, New York, NY., pp. 650–655, (1982).

O. Olabisi, et al., "Polymer–Polymer Miscibility," Acad. Press, New York, NY., pp. 240–243, 268–277, 313–317, (1979).

"Packaging/Food Products," Eastman Chem. Co., http://www.eastman.com/Markets/Packaging/Food/ProductHome.asp?EastmanDotCom–T . . . (Dec. 20, 2000).

"Packaging/Food Applications," Eastman Chem. Co., http://www.eastman.com/Mark ts/Packaging/Food/List Applications.asp? Product id=18&E . . . (Dec. 20, 2000).

"Plastic Additives, An A–Z reterence," edited by G. Pritchard, Chapman & Hall, New York, NY., pp. 94–107, (1998).

"Polymer Modifier and Additives," edited by J.T. Lutz, et al., Marcel Dekker, Inc., New York, NY., pp. 70–71, 330–343, 358–361, (1989).

"VERSATRAY CPET Polyester 12822 Product Data Sheet," Eastman Chem. Co., http://www.eastman.com/ProductCat/ProdDataSheet.asp?Productid=18&EastmanDotCom . . . (Dec. 20, 2000).

"Material Safety Data Sheet—'VERSATRAY' Plastic 12822," Eastman Chem. Co., Kingsport, TN., pp. 1–2 (Feb. 16, 2000).

"Thermx Copolyester for Dual–Ovenable Trays," Eastman Chem. Co., Kingsport, TN., Pub. No. TRS–88D, pp. 1–10 (1996).

* cited by examiner

DISPOSABLE BAKEWARE WITH IMPROVED DRIP RESISTANCE AT ELEVATED TEMPERATURES

BACKGROUND OF THE INVENTION

1. Field of the Invention

Our invention relates to bakeware obtained by molding polyester blend compositions, and preferably food-grade-compliant, disposable bakeware. Furthermore, our invention relates to methods of manufacturing bakeware from these polyester-blend compositions.

2. Description of the Related Art

Thermoplastic bakeware products for use in conventional and microwave ovens are well known in the art. These bakeware products typically include polyesters of ethylene, propylene, and butylene, particularly in their partially crystallized form. Those materials can withstand the high temperatures required of bakeware products. In addition, those materials are safe for storing and serving food items, i.e., they are considered to be food-grade materials.

However, a common problem with conventional thermoplastic bakeware is that the bakeware can catch fire. The risk of fire is primarily due to the dripping and stringing of the bakeware article onto a heat source, e.g., an electric heating element or open flame, when the thermoplastic material reaches its melting point. Upon direct contact with a heat source, the melted plastic may ignite quickly. The stringing or dripping plastic then can act as a bridge for the fire, whereupon flames may consume the whole article.

One solution for such unintentional fires has been to produce plastic bakeware products with flame retardants and/or fillers. Such flame-retardants are well known and examples include antimony, phosphate, and halide containing compounds. The flame retardants may act through different mechanisms, including the release of free radicals to terminate gas ignition, conversion of flammable gases to non-flammable gases, and promotion of char formation, to name a few. The addition of fillers can increase the potency of some flame retardants. For example, talc or calcium phosphate may be used to augment the known flame retardant ammonium phosphate (See, Levchik, et al., *Polymer Degradation and Stability*, 54, Nos. 2–3, pp. 361–3 (1996)). Reinforcing fillers typically include substances in a fibrous or plate-like form, such as carbon, talc, mica, glass, asbestos, wollastonite, titanium dioxide, boron whiskers, steel, copper, and aluminum. On their own, these fillers strengthen the formed product, providing for stiff, durable articles that retain their shape under physical stresses. However, such fillers can make the material brittle and may cause fabrication difficulties in certain manufacturing processes.

Even with the above-discussed methods for fire prevention, the plastic bakeware products currently available on the market typically melt at temperatures above 425° F., which, when used in a conventional oven, may cause them to string or drip down onto the heat source and catch fire. Accordingly, an important step in reducing the risk of fire is preventing the stringing or dripping of such bakeware products.

Conventionally, the prevention of stringing and dripping onto a heat source has been achieved through the use of protective sheets, upon which the bakeware may rest when placed in a conventional oven. However, the advantages of food-grade-compliant plastic bakeware products that will reduce or inhibit dripping and stringing at temperatures above 425° F. are significant when one considers that consumers may forget to place their plastic bakeware products on the protective sheets. Problems also arise with ovens that have poor temperature control. In these ovens, the user may set the oven at a temperature well below the melting point of the plastic, but the oven may actually regulate the temperature much higher, causing the plastic to melt.

Therefore, our invention is directed to bakeware made from thermoplastics that avoid the above-mentioned problems by using a blend of polyester and phenoxy resins in the compositions. As discussed in more detail later, transesterification occurring between the polyester and phenoxy resins at high temperatures helps to suppress/reduce dripping and stringing of the plastic.

U.S. Pat. No. 4,370,438 ("the 438 patent") discloses compositions comprising a blend of two different polyesters. The main objective of the invention described in that patent is to prevent transesterification from occurring in the product, specifically between the blended polyesters. In fact, the patent fails to recognize any benefits in allowing transesterification to occur. A latter portion of the '438 patent indicates that the polyester compositions may optionally include phenoxy resins. However, we note that the compositions described in that patent are non-food-grade inasmuch as they contain fillers, such as glass fibers or heavy-metal salts, which are not approved by the Food and Drug Administration (FDA) for use in contact with food. Accordingly, that patent also fails to recognize the benefits of blending polyester and phenoxy resins in bakeware articles.

Furthermore, the compositions suggested in the '438 patent contain reinforcing agents. In particular, all of the embodiments exemplified in the '438 patent use reinforcing fillers at 31 percent, by weight. While the fillers provide flame retardant qualities, they can also cause the material to be too brittle to use in some molding techniques, such as thermoforming.

U.S. Pat. No. 3,962,174 also discloses polyesters for use in non-food-grade compliant articles. We believe the subject matter described therein suffers from the same disadvantages as the compositions discussed in the '438 patent.

These shortcomings in the related art are further evidenced by the lack of thermoplastic bakeware products available that reduce/suppress dripping and stringing at the higher temperatures possible with our invention. Specifically, currently available thermoplastic bakeware is more susceptible to the risk of fire, and thus less safe than articles according to our invention.

BRIEF SUMMARY OF THE INVENTION

It is an object of the present invention to provide thermoplastic bakeware articles (i.e., articles formed to hold, contain or support food, while being heated in a microwave, conventional oven, convection oven, or the like) that are resistant to dripping, stringing, and melting at high temperatures.

In a first embodiment, our invention is directed to a bakeware article formed from a material comprising a crystalline polyester resin and a phenoxy resin, as well as a process of making the same.

In a second embodiment, our invention is directed to an article having a composition comprising a partially crystalline polyester resin and a phenoxy resin. The article is formed as a food-grade bakeware article. The composition is formulated so as to allow cross-linking between the polyester resin and the phenoxy resin at temperatures above about 400° F.

In a third embodiment, our invention is directed to a thermoformed article comprising a partially crystalline polyester resin and a phenoxy resin, and having less than about five percent, by weight, of a reinforcing filler. The article is formed as a food-grade bakeware article. The composition is formulated so as to allow cross-linking between the polyester resin and the phenoxy resin at temperatures above about 400° F.

In a fourth embodiment, our invention is directed to a process of making a thermoformed article. The process includes the steps of (i) providing a thermoplastic sheet of a composition comprising a polyester resin, a phenoxy resin, and less than 5 percent, by weight, of a reinforcing filler, and (ii) thermoforming the sheet into a food-grade bakeware article. The thermoplastic composition is formulated so as to allow cross-linking between the polyester resin and the phenoxy resin at temperatures above about 400° F.

In a fifth embodiment, our invention is directed to an article formed of a material comprising a partially crystalline polyester resin and a phenoxy resin. The polyester resin is chosen from the group consisting of poly (ethylene terephthalate) and THERMX™ Copolyester 6761, available from Eastman Chemical Company, Rochester, N.Y. The article is formed as a food-grade bakeware article. The composition is formulated so as to allow cross-linking between the polyester resin and the phenoxy resin at temperatures above about 400° F.

In a sixth embodiment, our invention is directed to a process of making an article. The process includes the steps of (i) providing a composition comprising a polyester resin and a phenoxy resin, and (ii) thermoforming the sheet into a food-grade bakeware article. The polyester resin is chosen from the group consisting of poly (ethylene terephthalate) and THERMX™ Copolyester 6761. The thermoplastic composition is formulated so as to allow cross-linking between the polyester resin and the phenoxy resin at temperatures above about 400° F.

In more preferred embodiments, the composition of the bakeware article may further comprise nucleating agents, impact modifiers, antioxidants, colorants, lubricants, and anti-drip additives.

In another preferred embodiment, our invention is directed to a bakeware article and process for making the same, in which the article comprises a partially crystalline polyester resin in an amount of about 64.5 percent to about 85.9 percent, by weight, and a phenoxy resin in an amount of about 1 percent to about 25 percent, by weight. In a most preferred embodiment, the article may further comprise (a) a nucleating agent in an amount of about 0.1 percent to about 10 percent, by weight, (b) an impact modifier in an amount of about 0.5 percent to about 25 percent, by weight, (c) an antioxidant in an amount of about 0.01 percent to about 1 percent, by weight, (d) a fibrillated polytetrafluoroethylene (PTFE) resin in an amount of about 0.01 percent to about 2 percent, by weight, and (e) less than about 5 percent, by weight, of reinforcing fillers.

DETAILED DESCRIPTION OF THE INVENTION

Figure 1:
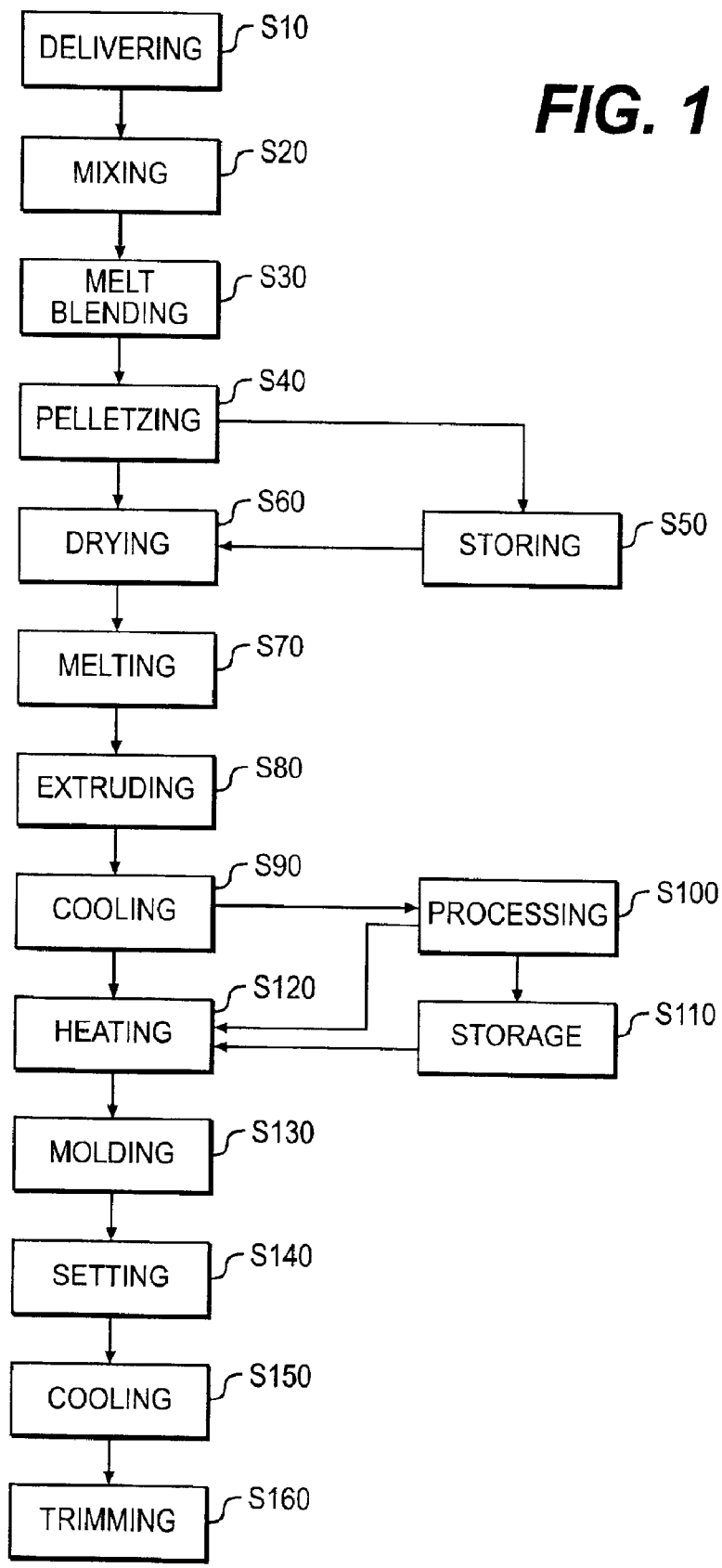
FIG. 1, is a flow diagram showing one process of manufacturing bakeware articles according to our invention.

We have found that transesterification between polyester and phenoxy resins at high temperatures suppresses/reduces dripping and stringing of bakeware products at elevated temperatures. Accordingly, we can prevent a primary cause of bakeware products catching fire—contact of the material with the heat source. Furthermore, when the bakeware is also formed with various combinations of additional components selected from the group consisting of PTFE resin, nucleating agents, impact modifiers, and antioxidants, highly suitable food-grade-compliant bakeware products are possible. Therefore, our invention is directed to bakeware articles formed from these superior compositions, and methods of making such bakeware articles. We note that food-grade refers to structures and/or materials safe for storing, cooking, heating, and/or serving food intended for human consumption. Useful information and/or guidelines helpful in achieving this feature may be found at the Food and Drug Administration, or other similar or equivalent agency or office.

Polyesters

The term "polyester" as used herein is considered those polymers that are connected by ester bonds. Such polyesters may include, but are not limited to, polyesters of a single type, e.g., poly (ethylene terephthalate) and blends of 2 or more polyester polymers, e.g., poly (ethylene terephthalate) and poly (propylene terephthalate). Also included in the term "polyester" as used herein are those known polyesters known as copolyesters, which are formed from the polymerization, by esterification, of two or more base units, such as the polymerization of butylene glycol with ethylene glycol. As used herein, the term "polyester" may include any one or more of the polymers discussed above.

Preferred polyester resins include the short-alkylene-chain polyesters. Preferred short-alkylene-chain polyesters are those provided by prop short-alkylene-chain resins provided by ethylene. Preferably, the polyesters are terephthalate-based. These resins are known in the art and examples of methods of their manufacture are discussed in U.S. Pat. Nos. 2,465,319 and 3,047,539, which are incorporated herein in their entirety. These short-alkylene-chain polyester resins are preferred because of their high melting temperatures, particularly in their partially crystallized form. Melting points of such partially crystallized resins of these polyesters are often higher than 400° F.

Other preferred polyester resins include the VERSATRAY™ 12822 and THERMX™ 6761 lines of polyesters, available through the Eastman Chemical Company of Rochester, N.Y., TRAYTUF™ 8506 and COBIFOAM™ 0, available through M&G Polymers (formerly Shell Oil Company Corporation) of Apple Grove, W.Va., and TEIJIN™ PEN, available through the DuPont Company of Wilmington, Del. Each of these polyesters is capable of withstanding the high temperatures required of our invention and is approved for food-related use.

Of course, any number of polyesters may be used depending on the desired characteristics of the end product. Some of the considerations for choosing a suitable polyester are set forth below.

Preferably, the polyester is partially crystallized in the end product, which may confer increased flexural strength, rigidity, and heat resistance to the article formed. Most preferably, the polyesters used in the articles and processes of our invention provide for a product that inhibits flow at temperatures below 400° F.

VERSATRAY™ CPET Polyester 12822 can have a crystalline melting temperature of 482° F. and THERMX™ Copolyester 6761 can have a crystalline melting temperature of 545° F.

When a polyester is mixed with other ingredients, the melting temperature of the composition may differ from that of the polyester alone. Hence, when blends of polyesters or additives are used, the final article should have a melting temperature suitable for the article's intended end use. Tests of such features are well known in the art and include differential scanning calorimetry, as well as other methods.

There are also many adjustments that may be made to the polyester composition to raise its melting temperature. Examples of such adjustments include: (a) raising the amount of polyester in the composition; (b) raising the crystallinity of the polyester; (c) when present, lowering the amounts of components with lower melting temperatures; and (d) adding heat-resistant materials to the composition. These and other adjustments are also well known in the art.

The useful molecular weight range of the polyesters is another consideration. Typically, the lower range of molecular weight polyesters will confer more brittle characteristics on the end product. Higher molecular weight polyesters will increase strength and melting temperatures, leading to improved mechanical strength in the bakeware article. (These parameters may be further adjusted by limiting the crystallinity and/or amounts of polyester used.) We have found, for example, that poly (ethylene terephthalate) with a molecular weight in the range of 20,000 to 40,000, when partially crystallized, can be used in our invention.

A manufacturer may also wish to consider the quantity of polyester utilized in the composition of our invention. The amount used should be adjusted to accommodate the preferred strength and melt characteristics. Preferably, an article according to our invention comprises from about 64.5 percent to about 85.9 percent, by weight, of polyester. Typically, the lower the amount of polyester, the lower the stiffness and durability of the final product, while increasing the amount of polyester may cause the product to be more brittle. The thickness of the article may also be a consideration, as thicker articles are generally stiffer. For example, very thin materials, ranging from 5 to 15 mils in thickness may be flimsy, but could be used as a disposable liner within a more rigid pan. On the other hand, a thickness of 15 to 35 mils may have the ability to act as a stand-alone article. Determining the best combination of features depends on the ultimate design desired.

Because our invention is preferably directed to thermoplastic items for oven use, temperature stability, as discussed above, is an important consideration. However, a bakeware article may also be intended for storing food in a frozen state before heating the product. In other situations, the end user may put the bakeware through many freeze-thaw cycles during its useful life. Therefore, when choosing polyesters, it is important to consider how the product will be used. These considerations will allow the manufacturer to choose polyesters that are less expensive, stronger, more durable, etc., as necessary.

The stock of polyester utilized in the manufacture of our invention is preferred to be in raw pellet form. It is also preferred that the stock be dried prior to use. Drying the stock prevents hydrolytic degradation of the polyester that may occur when the polyester is melt blended and thermoformed. (Melt blending and thermoforming will be discussed in more detail below.) The preferred stock polyester is typically 4–10 percent crystalline in form, which also helps to prevent the pellets from sticking into an unusable mass during the drying process.

Phenoxy Resin

The composition of our invention further comprises phenoxy resins, also known as polyhydroxyether resins. Phenoxy resins are known compounds. These resins have been used to improve strength, flexural resistance, and impact resistance in compositions.

Preferably, the phenoxy resins utilized in this invention are those of high molecular weight obtained by the polymerization of 2,2-(4-hydroxyphenyl) propane and epichorhydrin. Their preparation is known in the art, and is described, for example, in U.S. Pat. No. 3,356,646, which is incorporated herein in its entirety. The molecular structure of these resins is a repeating unit of the following structure:

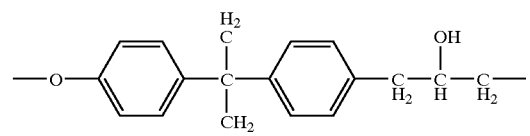

wherein the number of repeated units may vary widely, but is preferably from about 10,000 to about 16,000 by number average molecular weight ($M_n$) and from about 40,000 to about 60,000 by weight average molecular weight ($M_w$). Typically, the terminal end units of a phenoxy polymer are completed with hydrogen atoms or suitable end-capping groups.

In this invention, at high temperatures, we believe it is the transesterification occurring between the phenoxy polymers and polyester polymers that leads to an improved bakeware product. Transesterification is the substitution of one alcohol moiety for another. The following chemical reaction demonstrates this substitution:

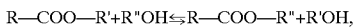

wherein R, R', and R", may or may not be the same chemical structures.

The ester linkages of polyester are susceptible to such transesterification. In the presence of the phenoxy resin, these ester bonds undergo transesterification with the phenoxy alcohols, effectively cross-linking parts of the polyester and phenoxy polymers. This reaction is accelerated at higher temperatures. Accordingly, the higher the temperature of a composition containing polyester and phenoxy polymers, the more cross-linking that occurs. We have found that it is this reaction that suppresses the dripping and stringing of compositions at high temperatures. More specifically, we have found that the cross-linked product of these two polymers caused by the transesterification reaction forms a molecular net. This net acts to keep all the ingredients, including the polymers, together in the melted plastic and reduces/suppresses the dripping of the melted plastic.

The temperature of the preferred transesterification reaction rate of polyester and phenoxy resins ranges according to the types of polyester and phenoxy resins used; however, it is near 450° F. in most cases. To determine if any particular pair of ester and phenoxy resins has a suitable transesterification reaction temperature, one could perform a differential scanning calorimetry experiment and find the temperature of reaction.

Other than the temperature of reaction, some factors that may influence the choice of a phenoxy resin include (i) food-grade compliance, (ii) miscibility during manufacture, and (iii) molecular weight.

Food-grade compliance is set by FDA food-grade guidelines. Preferably, a bakeware article of this invention complies fully with those guidelines. However, it is possible to provide a bakeware item with a non-food-grade outer layer and a food-grade liner, and still achieve the benefits of our invention.

With respect to miscibility, if the polyester and phenoxy resins are not mixed evenly, pockets of one or the other may form, leading to areas of the final product that may drip. To avoid this problem, we prefer to use a phenoxy resin that is miscible with the balance of the composition. Initial choices may be assisted by the use of the chemical companies that provide these resins.

The molecular weight ("MW") of the phenoxy resin polymer is important in that smaller MW phenoxy resins are less preferable. Typically, larger MW phenoxy resins impart less brittle character to the bakeware. In addition, the larger MW phenoxy resins produce stronger products at high temperatures. Although, in practice, we have not found a phenoxy resin polymer that was too large in size, theory dictates that higher molecular weights may cause blending problems. Preferably, phenoxy resins have a molecular weight average of about 40,000 to about 60,000, and a molecular number average of about 10,000 to about 16,000. One preferred phenoxy resin is PAPHEN™ Phenoxy PKFE, available through Phenoxy Specialties, Rock Hill, S.C.

Generally, the amount of phenoxy resin used in an article according to our invention ranges between about 1 percent to about 25 percent, by weight. A preferred amount of phenoxy resin ranges from about 3 percent to about 15 percent, by weight. A most preferred amount of phenoxy resin ranges from about 5 percent to about 10 percent, by weight.

Similar to the issues regarding the stock of the polyester resin, the phenoxy resin is susceptible to hydrolysis, and the reaction chemicals that form the resin should be removed by drying before processing the resin, in order to avoid problems in the manufacture of our invention.

Polytetrafluoroethylene (PTFE)

The compositions of the present invention may also include a fibrillated PTFE resin. The use of fibrillated PTFE resins provides three advantages to our invention. The first advantage is that it is an anti-drip additive. The second advantage is that thermoplastics incorporating this resin typically recoil from heat sources. The third advantage is that it acts as a lubricating agent, which allows for easy release of melted product from a surface.

Considerations in choosing a PTFE for use in a composition may include (i) fibrillation capability, (ii) melting behavior, and (iii) molecular weight.

In choosing a PTFE, it is preferable that the PTFE is fibrillated in the articles of our invention. Typically, the PTFE may be fibrillated by the compounding operation that incorporates the PTFE into the composition. The fibrillated PTFE assists in making the article anti-drip, as well as causing the material to contract away from heat sources. The manufacturer of the PTFE typically can assist in choosing a fibrillatable PTFE as well as how best to compound the PTFE into the composition.

With respect to molecular weight, if the molecular weight of the PTFE utilized is too high, the PTFE may become difficult to blend into the composition, leading to slower compounding operations. If the molecular weight is too low, the PTFE particles may lose their fibrillated character, making them less useful in our invention. Manufacturers of PTFE products are the most appropriate resource in choosing a PTFE of optimal character.

Typically, enough PTFE is added to further assist in suppressing the dripping of the product at its melting temperature. Also, there should be enough PTFE to allow easy removal of the melted composition from a surface. However, if too much PTFE is used, the processing equipment may become too greasy, leading to problems during manufacture. Preferred amounts of PTFE are from about 0.01 percent to about 2.5 percent, by weight, of the final composition. More preferred amounts of PTFE are from about 0.05 percent to about 1.0 percent, by weight. Most preferred amounts of PTFE are from about 0.1 to about 0.5 percent, by weight.

Preferred PTFE polymers are generally disclosed in U.S. Pat. Nos. 3,005,795, 3,671,487, 4,463,130, and 4,927,870. These patents are incorporated herein in their entirety. One preferred PTFE according to the above considerations is TEFLON™ PTFE 6C, manufactured by The DuPont Company, Wilmington, Del.

Nucleating Agents

The compositions used to form an article according to this invention may also include nucleating agents. Nucleating agents are used in order to assist the crystallization of the polyester. Nucleating agents reduce the amount of time needed to form crystals of the polyesters, thereby reducing the manufacturing cost. U.S. Pat. No. 5,431,972 describes generally the use of nucleating agents and their effect on polyester crystallinity. This patent is incorporated herein in its entirety.

Typically, the nucleating agent is a powder of organic polymers, such as polyethylene or polypropylene, or inorganic minerals, such as talc. Preferably, the nucleating agent may have a melt index from about 0.5 to about 2.5, in grams per minute. These melt indices are generally well suited to assist the nucleation of crystals during manufacturing processes. Nucleating agents are well known in the art and they may be obtained from standard chemical companies. One preferred nucleating agent is the combined nucleating agent and antioxidant E3031-84AA, manufactured by Eastman Chemical Company and designed for use with VERSATRAY™ CPET 12822. Another preferred nucleating agent is DOWLEX™ LLDPE 2038, manufactured by the Dow Chemical Company.

Preferred amounts of nucleating agent range from about 0.1 percent to about 10 percent, by weight, of the final product. More preferred amounts of nucleating agent range from about 0.5 to about 5 percent, by weight. Most preferred amounts of nucleating agent range from about 1 percent to about 3 percent, by weight.

Impact Modifiers

Impact modifiers may be incorporated in our invention to improve the ability to absorb energies of impact forces. (See, *Polymer Modifiers and Additives*, edited by J. T. Lutz and R. F. Grossman (2001), for an explanation of the use impact modifiers.)

The impact modifiers are typically rubber-like substances that absorb impact energy. Accordingly, these components help to reduce the brittleness of the end product.

A consideration in choosing an impact modifier for this invention is the ability to withstand temperature stresses. For this reason, acrylic impact modifiers are preferred. Their heat and cold stability enables an article to withstand the rigors of many freeze/thaw cycles. Examples of preferred impact modifiers include PARALOID™ EXL 5375, available through Rohm and Haas Company, Philadelphia, Pa., and IM 21182 CP001C, which is an impact modifier suspended in a poly (ethylene terephthalate) resin, available through Eastman Chemical Company.

In deciding how much impact modifier to use, one may be guided by the need to balance heat resistance with brittleness. If more impact modifier is used, the end product may become more rubbery and have a lower heat resistance. Also, increasing the amount of impact modifier will directly increase impact strength. If less is used, the end product may be more brittle.

We have found that preferred amounts of impact modifier in the present invention range from about 0.5 percent to about 25 percent, by weight. More preferred amounts of impact modifier range from about 1 percent to about 15 percent, by weight. Most preferred amounts of impact modifier range from about 3 percent to about 10 percent, by weight.

Antioxidants

Antioxidants may be utilized in our invention in order to protect the product from (i) polyester and phenoxy degradation due to thermal oxidation during the compounding operation, (ii) phenoxy resin cross-linking to the polyester during manufacture, (iii) long-term degradation of the components of the product, and (iv) discoloration.

Any one of a number of antioxidants may be used (see, *Plastic Additives: an A to Z Reference*, edited by G. Pritchard (1998)). However, a few preferred antioxidants are those that contain phosphite, thioester, hindered phenol, and secondary aromatic amine groups. These chemical moieties, when provided in an antioxidant, confer protection that is useful in the present invention. They appear to be particularly effective in suppressing transesterification during the manufacture of articles of our invention (as opposed to the transesterification which occurs during use of the end product at high temperatures).

Other preferred antioxidants include the antioxidant in E3031-84AA, manufactured by Eastman Chemical Company, the Ciba IRGANOX™ series of antioxidants, manufactured by Ciba Specialty Chemicals, Inc., of Suffolk, Va., and the ALVINOX™ series of antioxidants, manufactured by the 3V Company, of Weehawken, N.J.

It may be preferred to mix multiple antioxidants in order to inhibit different chemical reactions. For example, the use of a phosphite-containing antioxidant with a phenolic-containing antioxidant will allow the manufacturer to guard against cross-linking the poly (ethylene terephthalate) and phenoxy resins during processing, and increase the shelf life of the product, while other antioxidants may be used to inhibit discoloration.

Preferred levels of antioxidant range from about 0.01 percent to about 1 percent, by weight. More preferred levels of antioxidant range from about 0.05 percent to about 0.5 percent, by weight. Most preferred amounts of antioxidant range from about 0.1 percent to about 0.2 percent, by weight.

Reinforcing Fillers

The product of this invention may also contain one or more reinforcing-filler materials. These materials are typically used for reinforcement and/or cost-saving measures.

Typically, fillers are fibrous or plate-like materials. When used in compositions which may come into contact with food items, these fillers should be food-grade. When not contacting food items, any number of fillers may be used, such as mica, talc, vermiculite, carbon, or glass fibers. These fibers tend to strengthen the product of our invention.

These fibers, because of their brittle nature, are typically difficult to use in thermoforming operations. The fibers may make sheets used for thermoforming too stiff for forming within an acceptable time frame. We have found that, when present in lesser amounts, these reinforcing fillers may be used when thermoforming articles of the present invention. However, when thermoforming, manufacturers may wish to avoid fillers altogether.

Generally, when the product is thermoformed, the reinforcing fillers may be present in an article according to our present invention in an amount less than about 5 percent, by weight. A preferred amount of reinforcing filler is in an amount less than about 3 percent, by weight. It is most preferred to have substantially no reinforcing filler in this invention.

The product of our invention may also contain one or more pigments, dyes, or heat stabilizers. For example, a few pigments that are food-grade approved include Ultramarine Blue pigment, available through standard chemical pigment manufacturers and TI-PURE™ R101 and R104, available through the DuPont Company. It is to be appreciated that other materials may be added to the composition of our invention without departing from the intended scope of our invention.

Process of Manufacture

The thermoplastic compositions of our invention may be prepared from initial starting materials that are compounded together in predetermined ratios by any one of a number of known methods. One convenient method we have employed for compounding the components into a stock that may be stored or utilized immediately is by melt-blending the materials in a predetermined ratio.

FIG. 1 demonstrates the steps of a preferred method we employ to obtain the melt-blended stock and form a bakeware article from the same. In components to a production line at predetermined weight percent ratios, preferably according to the considerations mentioned above. One delivery method we typically employ involves the use of weigh feeders. In weigh feeding, each component is placed in a separate container. Each container is able to weigh out amounts of the component and deliver it to the production line at a predetermined rate.

In Step S20, the components delivered to the production line are mixed. In our experience, we have found a tumbler to be useful for the mixing of these components. A typical tumbler is a cylindrical device, wherein the cylinder is on an axis that is neither horizontal nor vertical to the direction of the pull of gravity. The components are delivered into the higher end of the tumbler. The tumbler rotates about its axis, mixing the components, and has an opening at the lower end of the cylinder, which releases the heterogeneously mixed solids into the next step of the production line, that of melt-blending.

In Step S30, the heterogeneously mixed solids, delivered from Step S20, are melt blended. Through melt blending, the mixture is melted and mixed together (i.e., compounded) into a homogeneous fluid. We typically employ a twin-screw extruder for the melt-blending step, although a single-screw extruder or other device may also be used. The extrudate is then a homogeneous mixture of ingredients.

In Step S40, the melt-blended stock is pelletized for storage in Step S50, or drying, in Step S60. In Step S40, the liquid stock is extruded through a die and cooled. Cooling typically takes place in a water bath. The cooled material is then pelletized, e.g., ground or chopped into smaller pieces, which may be stored or dried for further processing.

The stock pellets may be stored in Step S50. Here the pellets are stored in containers, at room temperature, for later use.

In Step S60, whether stored or used immediately, the stock material is dried. The drying of the pellets removes water, which may accumulate and cause hydrolytic degradation of the stock in later steps of the process. One method we have found useful for drying the stock material of our invention is the use of a tumble dryer. The tumble dryer is similar to the tumbler used in Step S20, in that it is a cylindrical container, with an axis that is neither perpendicular nor horizontal to the direction of the pull of gravity. Material from Step S40 or Step S50 is delivered into the tumble dryer, which turns about its axis and is heated. The typical drying temperatures of the tumble dryer are in the range of 374° F. to 392° F. The object of this drying step is to remove water as well as to crystallize the polyester in the composition to a level of about thirty percent, which assists in preventing the pellets of the composition from sticking (these crystals are melted out at later steps).

In Step S70, the pellets are then melted again for use in an extruding step. We have found that a preferred method of melting these stock pellets is by single-screw extrusion.

Preferably, this molten stock may be used in extruding stock sheets for thermoforming procedures, although other molding methods are possible.

In Step S80, the molten stock is formed into sheets (or "films"), which may be used for thermoforming. One method we have found useful for forming these sheets is by passing this molten sheet through a slit die of a predetermined thickness and width. The material is extruded through the die and cooled in Step S90 in order to limit the crystallinity of the polyester that develops in the sheet as it solidifies. The die may be equipped with a feed block for co-extrusion to form a sheet with multiple layers. Such extrusions are generally known in the art as twin-sheeting or multi-sheeting extrusions. Among the advantages offered through forming multiple layers is cost reduction achieved by providing sheets with different contents.

If the sheet is kept too long at the crystallization temperature, the crystallinity of the polyester may rise in the sheet composition, causing the melting temperature of the sheet to rise. This raises the temperature that must be reached in later manufacturing steps, such as thermoforming, adding to manufacturing costs. Therefore, the sheet passed through the die is preferably cooled down below the crystallization temperature before the polyester becomes substantially crystalline. (The crystallinity of the end product, which, as discussed above, is beneficial to its heat resistance, is achieved at a later step in the manufacturing process.)

Accordingly, in Step S90 the extruded sheet is cooled. For this cooling step, one method we have found convenient is the use of chill rolls. The sheet, or co-extruded sheet, is forced between a pair of chill rolls in order to cool the sheet. For example, a 35 mil sheet at 545° F. may be cooled well below typical crystallization temperatures with three sets of rollers: (1) a first at 68° F. with a contact time of 2 seconds; (2) a second at 122° F. with a contact time of 15 seconds; and (3) a third at 122° F. with a contact time of 20 seconds. Typically, the temperatures of the chill rolls and contact times may vary, depending on such variables as sheet thickness, chill roll diameter, and line speed. Such adjustments are known in the art.

Optionally, the cooled sheet may then be processed for use, as in Step S100. In this step, the sheet is cut and/or trimmed into more useful-size pieces for further processing. Such processing may also include rolling the sheets into manageable sizes for storage.

In Step S110, the sheets are stored at room temperature for later use. Typically, no drying step is needed before using the stored sheets in further production, as hydrolytic degradation is not typically a concern at the temperatures reached in later steps.

Step S120, the sheet delivered from any one of Steps S90, S100, or S110, is heated, preferably to a temperature below the crystal-forming temperature of the polyester, as well as below the temperature at which the polyester sheet may excessively sag. However, the temperature is preferably high enough to allow easy molding in the later thermoforming steps. The optimal temperature for this is related to the composition as a whole, and as such, is left to the manufacturer. The heated sheets are then thermoformed.

The thermoforming operation itself is typically a two-step process. In the first step, Step S130, the preheated sheet is preferably forced into a female mold at the preheated temperature. This may be accomplished in a number of ways. Typically, the manufacturer may use a male mold or pressure differentials to accomplish the fitting of the sheet into the female mold. The sheet then may be released from the female mold and fed to the setting step.

In Step S140, the sheet is set in a second mold that holds the formed article and raises the temperature of the article to a temperature at which crystals may form quickly. This temperature is typically slightly below the crystal melting temperature of the material. For example, if a polyester has a crystal melting temperature of 545° F., the temperature of the second mold might preferably be 536° F. The formed sheet is held and incubated in this second mold for a short period of time, typically a few seconds. The choice of time may depend on considerations such as the level of crystallinity desired, the amount of nucleating agent, thickness of the sheet, and the temperature at which the sheet is incubated.

In Step S150, the product is cooled to room temperature, typically under fans.

In Step S160, any unwanted edges are preferably trimmed off, yielding an end product. The trimmings may be recycled at step S70, at up to 50 percent.

EXAMPLES

In order to determine the efficacy of thermoplastic compositions of our invention, six plaques were prepared and tested in an oven. The plaques each had essentially the same character as a bakeware article. Table 1 sets forth the compositions of the tested plaques.

TABLE 1

| Compositions of Plaques given in Weight Percent. | | | | |
|---|---|---|---|---|
| Poly Crystalline (ethylene terephthalate) | Phenoxy Resin | Nucleating Agent | Impact Modifier | PTFE 6C (Polytetrafluoroethylene) |
| Plaque 1 | 85.0 | 0 | 3 | 12 | 0.0 |
| Plaque 2 | 84.9 | 0 | 3 | 12 | 0.1 |
| Plaque 3 | 80.0 | 5 | 3 | 12 | 0.0 |
| Plaque 4 | 75.0 | 10 | 3 | 12 | 0.0 |
| Plaque 5 | 79.9 | 5 | 3 | 12 | 0.1 |

Two control plaques were manufactured, one plaque containing no anti-drip components (Plaque 1), and another plaque containing PTFE 6C (Plaque 2). These plaques were compared with similarly prepared plaques containing 5 percent, by weight, phenoxy resin (Plaque 3), 10 percent, by weight, phenoxy resin (Plaque 4), and the combination of phenoxy resin and PTFE (Plaque 5).

The plaques were tested in an electric oven upon a rack above the heating coils. The oven was heated to 600° F., and then the reaction of each plaque was observed. Those observations are set forth in Table 2.

TABLE 2

Observations of Heated Plaques.

| Composition | Dripping | Stringing | Drip Fire | Mass Fire |
| --- | --- | --- | --- | --- |
| Plaque 1 | YES | YES | YES | YES |
| Plaque 2 | YES | NO | NO(*) | NO |
| Plaque 3 | YES | NO | YES | NO |
| Plaque 4 | NO | NO | NO | NO |
| Plaque 5 | NO | NO | NO | NO |

(*)Drip did not ignite visibly, but did smoke.

"Dripping" refers to dripping of material from the plaque. "Drip Fire" refers to the ignition of dripped materials that contacted the heating coil of the oven. "Stringing" refers to stringing of the melted plaque down from the plaque. "Mass Fire" refers to whether the whole of the plaque caught fire.

As shown in table 2, Plaque 1, constructed with a composition not including a phenoxy resin or PTFE 6C, exhibited dripping, stringing, drip fire, and mass fire. As shown with respect to Plaque 2, when PTFE 6C alone was added to the composition, dripping still occurred, but the dripping material did not ignite, although smoking did occur. For Plaque 3, when phenoxy resin comprised 5 percent of the composition of the plaque, stringing and mass fire were prevented, although some dripping and igniting of the drips did occur. In Plaque 4, when phenoxy resin comprised 10 percent of the composition of the plaque, by weight, no dripping, stringing or fires occurred. Similarly, in Plaque 5, when phenoxy resin comprised 5 percent, by weight, and PTFE 6C comprised 0.1 percent, by weight, of the plaque, no dripping, stringing or fires occurred.

Preferred compositions according to our invention were also tested in final, thermoformed products. Table 3 sets forth the compositions of the bakeware articles manufactured for testing.

TABLE 3

Compositions of Bakeware Articles Given in Weight Percent.

| Composition | Nucleating Agent | Impact Modifier | Phenoxy Resin | Polyetra-fluoroethylene | Antioxidant | Pigment (titanium oxide) |
| --- | --- | --- | --- | --- | --- | --- |
| Article 1 | 3 | 12 | 0 | 0.0 | * | 0 |
| Article 2 | 3 | 12 | 7 | 0.1 | * | 0 |
| Article 3 | 3 | 7 | 7 | 0.1 | 0.1 | 1 |

* Designates that antioxidant was supplied by the manufacturer as part of the nucleating agent utilized.

The balance of each composition in Table 3, to 100 weight percent total, comprised poly (ethylene terephthalate).

The bakeware articles in Table 3 were of uniform size and shape (the shape was generally pan-like and the thickness of each article was 35 mils) and were thermoformed. Each article was tested by placing the article on a rack in an electric oven and subjecting it to increasing temperatures up to 600° F. Observations were recorded concerning the reaction of each article in the heated oven. Table 4 sets forth the observations recorded for each article.

TABLE 4

Observations of Heated Bakeware Articles.

| | Dripping | Stringing | Drip Fire | Mass Fire |
| --- | --- | --- | --- | --- |
| Article 1 | YES (470° F.) | YES (470° F.) | YES (470° F.) | YES (490° F.) |
| Article 2 | YES (535° F.) | NO | YES (559° F.) | NO |
| Article 3 (First trial) | YES (515° F.) | NO | NO | NO |
| Article 3 (Second trial) | NO | NO | NO | NO |

As shown in Table 4, bakeware articles of the compositions given in Table 3 were tested. The parentheticals indicate the temperatures at which the observed reactions occurred. With respect to Article 1, when phenoxy resin and PTFE were absent from the composition, the bakeware articles dripped and stringed down, igniting the material and causing a fire that consumed the article. With respect to Article 2, comprising phenoxy resin and PTFE resin, dripping occurred at 535° F. and those drips caught fire at 559° F. With respect to Article 3, only one of the two trials exhibited dripping, while no other effects were observed.

The above examples demonstrate that bakeware articles formed with compositions according to our invention are more resistant to dripping and stringing than conventional bakeware compositions. Accordingly, our invention provides a bakeware article that is safer to use at high temperatures than currently available products. These examples, however, are not intended to be limiting, but are merely demonstrations of the effectiveness of the present invention. A wide range of formulations for bakeware articles can be manufactured according to the present invention, other than those exemplified above.

In particular, we note that many different combinations of components can be used to form bakeware articles according to our invention, while still keeping within the scope of the invention. Also, the bakeware articles may be manufactured by any one of a number of methods. While thermoforming is the preferred method, we recognize that many other conventional methods may be used. In addition, as discussed above, the choice of particular polyesters, phenoxy resins and additional components may vary depending on design choice, and those components may be mixed in various ratios, while still achieving the benefits of the invention.

In other words, while particular embodiments of our invention have been illustrated and described, it will be apparent to those skilled in the art that various changes and modifications may be made without departing from the spirit and scope of our invention. Furthermore, it is intended that the claims will cover all such modifications that are within the scope of our invention.

INDUSTRIAL APPLICABILITY

Our invention is directed to bakeware articles that demonstrate improved fire resistance when used in conventional or microwave ovens. In particular, this invention relates to bakeware articles composed of blends of polyester resins and phenoxy resins, which suppress dripping and stringing of melted material at high temperatures. We envision that our improved bakeware products will be extremely useful to consumers in applications such as trays for storing, baking and serving frozen meals and inexpensive re-usable bakeware, which are safer than those currently available.

We claim:

1. An article having a composition, the composition comprising:
   (a) a partially crystalline polyester resin; and
   (b) a phenoxy resin,
   wherein said article is formed as a food-grade bakeware article, and the composition is formulated so as to allow cross-linking between said polyester resin and said phenoxy resin at temperatures above about 400° F.

2. The article recited in claim 1, wherein, in the composition, the polyester resin is in an amount of about 64.5 percent to about 85.9 percent, by weight.

3. The article recited in claim 2, wherein, in the composition, the phenoxy resin is in an amount of about 1 percent to about 25 percent, by weight.

4. The article recited in claim 1, the composition further comprising a filler in an amount less than about 5 percent, by weight.

5. The article recited in claim 4, the composition further comprising a nucleating agent.

6. The article recited in claim 5, wherein the nucleating agent is present in an amount of about 0.1 percent to about 10 percent, by weight, of the composition.

7. The article recited in claim 5, the composition further comprising an impact modifier.

8. The article recited in claim 7, wherein the impact modifier is present in an amount of about 0.5 percent to about 25 percent, by weight, of the composition.

9. The article recited in claim 7, the composition further comprising an antioxidant.

10. The article recited in claim 9, wherein the antioxidant is in an amount of about 0.01 percent to about 1 percent, by weight, of the composition.

11. A thermoformed article having a composition, the composition comprising:
    (a) about 64.5 percent to about 85.9 percent, by weight, of a partially crystalline polyester resin;
    (b) about 1 percent to about 25 percent, by weight, of a phenoxy resin; and
    (c) less than about 5 percent, by weight, of reinforcing agent,
    wherein said thermoformed article is formed as a food-grade bakeware article, and the composition is formulated so as to allow cross-linking between said polyester resin and said phenoxy resin at temperatures above 400° F.

12. The article recited in claim 11, wherein the polyester resin is poly (ethylene terephthalate).

13. The article recited in claim 11, wherein, in the composition, the phenoxy resin is in an amount of about 5 percent to about 10 percent, by weight.

14. The article recited in claim 11, the composition further comprising a fibrillated polytetrafluoroethylene resin.

15. The article recited in claim 14, wherein the polytetrafluoroethylene resin is in an amount of about 0.01 percent to about 2 percent, by weight.

16. The article recited in claim 11, the composition further comprising a nucleating agent.

17. The article recited in claim 16, wherein the nucleating agent is in an amount of about 0.1 percent to about 10, by weight.

18. The article recited in claim 11, the composition further comprising an impact modifier.

19. The article recited in claim 18, wherein the impact modifier is an acrylic impact modifier.

20. The article recited in claim 18, wherein the impact modifier is in an amount of about 0.5 percent to about 25 percent, by weight.

21. The article recited in claim 11, the composition further comprising an antioxidant.

22. The article recited in claim 21, wherein the antioxidant is present in an amount of about 0.01 percent to about 1 percent, by weight.

23. The article recited in claim 11, wherein, in the composition, the polyester is in an amount of about 64.5 percent to about 85.9 percent, by weight, and the phenoxy resin is in an amount of about 1 percent to about 25 percent, by weight, the composition further comprising:
    (a) a nucleating agent in an amount of about 0.1 percent to about 10 percent, by weight;
    (b) an impact modifier in an amount of about 0.5 percent to about 25 percent, by weight; and
    (c) an antioxidant in an amount of about 0.01 percent to about 1 percent, by weight.

24. A process of making a thermoformed article comprising:
    (a) providing a sheet of thermoplastic composition comprising:
        (i) a polyester resin;
        (ii) a phenoxy resin; and
        (iii) less than about 5 percent, by weight, of reinforcing filler; and
    (b) thermoforming the sheet into a food-grade bakeware article,
    wherein the thermoplastic composition is formulated to allow cross-linking between the polyester resin and the phenoxy resin at temperatures above 400° F.

25. The process recited in claim 24, wherein the polyester resin is in an amount of about 64.5 percent to about 85.9 percent, by weight, of the composition.

26. The process recited in claim 24, wherein the phenoxy resin is in an amount of about 1 percent to about 25 percent, by weight, of the composition.

27. The process recited in claim 24, wherein the sheet provided in said providing step further comprises at least one component selected from the group consisting of a fibrillated polytetrafluoroethylene resin, an impact modifier, and an antioxidant.

28. The process recited in claim 27, wherein the sheet includes the polytetrafluoroethylene resin in an amount of about 0.01 percent to about 2 percent, by weight.

29. The process recited in claim 27, wherein the sheet includes the impact modifier in an amount of about 0.5 percent to about 25 percent, by weight.

30. The process recited in claim 27, wherein the sheet includes the antioxidant in an amount of about 0.01 percent to about 1 percent, by weight.

31. An article having a composition, the composition comprising:
(a) a partially crystalline polyester resin;
(b) a phenoxy resin; and
(c) a polytetrafluoroethylene,
wherein said article is formed as a food-grade bakeware article, and the composition is formulated so as to allow cross-linking between said polyester resin and said phenoxy resin at temperatures above about 400° F.

32. The article recited in claim 31, wherein, in the composition, the polyester resin is in an amount of about 64.5 percent to about 85.9 percent, by weight.

33. The article recited in claim 32, wherein, in the composition, the phenoxy resin is in an amount of about 1 percent to about 25 percent, by weight.

34. The article recited in claim 31, the composition further comprising a filler in an amount less than about 5 percent, by weight.

35. The article recited in claim 31, wherein the polytetrafluoroethylene is in an amount of about 0.01 to about 2 percent, by weight, of the composition.

36. The article recited in claim 31, the composition further comprising a nucleating agent.

37. The article recited in claim 31, the composition further comprising an impact modifier.

38. The article recited in claim 31, the composition further comprising an antioxidant.

* * * * *